United States Patent [19]
Alexander, Jr.

[11] Patent Number: 5,942,183
[45] Date of Patent: Aug. 24, 1999

[54] METHOD FOR EVERTING A LINER USING A COMPACT APPARATUS

[75] Inventor: Joseph A. Alexander, Jr., Memphis, Tenn.

[73] Assignee: Insituform (Netherlands) B.V., Netherlands

[21] Appl. No.: 08/789,018

[22] Filed: Jan. 27, 1997

Related U.S. Application Data

[62] Division of application No. 08/320,506, Oct. 7, 1994, Pat. No. 5,597,353.

[51] Int. Cl.⁶ ..................................................... B29C 63/36
[52] U.S. Cl. ......................... 264/516; 156/287; 156/294; 264/36.16; 264/269
[58] Field of Search ..................................... 264/516, 269, 264/36.16; 156/287, 294; 138/97, 98

[56] References Cited

U.S. PATENT DOCUMENTS

| | | | |
|---|---|---|---|
| 3,230,129 | 1/1966 | Kelly . | |
| 4,202,531 | 5/1980 | Hamrick . | |
| 4,368,091 | 1/1983 | Ontsuga et al. | 156/287 |
| 4,948,452 | 8/1990 | Morinaga et al. | 156/382 |
| 5,108,533 | 4/1992 | Long, Jr. et al. | 156/294 |
| 5,154,936 | 10/1992 | Driver et al. | 425/182 |
| 5,167,901 | 12/1992 | Driver et al. | 264/570 |
| 5,374,174 | 12/1994 | Long, Jr. | 425/11 |
| 5,454,401 | 10/1995 | Kamiyama et al. | 138/98 |

FOREIGN PATENT DOCUMENTS

| 1204726 | 8/1989 | Japan . |
|---|---|---|
| WO 92/14961 | 3/1992 | WIPO . |
| WO 92/05944 | 4/1992 | WIPO . |

*Primary Examiner*—Mathieu D. Vargot
*Attorney, Agent, or Firm*—Cowan, Liebowitz & Latman, P.C.; Michael I. Wolfson; Lloyd G. Buchanan

[57] ABSTRACT

A compact apparatus for everting a liner utilizing fluid pressure after the liner has been aligned with the conduit to be lined is provided. The apparatus includes a sphincter valve with its axis aligned with the conduit to be lined and an eversion pressure chamber overlapping a portion of the sphincter valve for reducing the length of the apparatus and allowing positioning in a sewer manhole. A downtube is positioned at the input side of the sphincter valve which can extend to the top of the manhole. To install a liner, the apparatus is placed in the entrance manhole with the sphincter valve aligned with the axis of the sewer pipe, the liner is inserted into the downtube, turned to align with the sphincter valve and conduit and fluid pressure is applied to the valve to engage the flattened liner which after passing through the valve is everted by fluid pressure as it enters the sewer pipe.

12 Claims, 6 Drawing Sheets

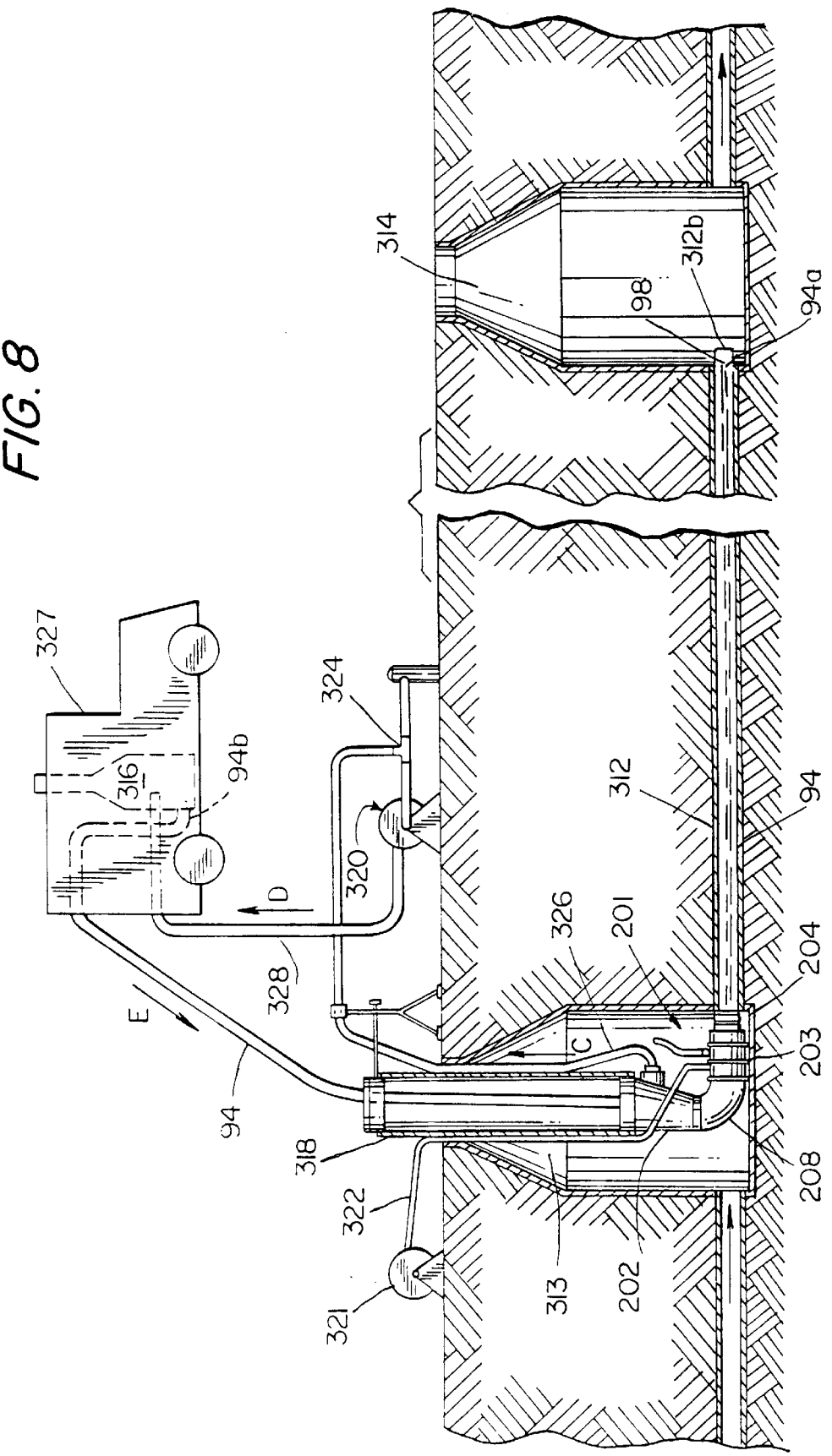

METHOD FOR EVERTING A LINER USING A COMPACT APPARATUS

This is a divisional of application Ser. No. 08/320,506 filed Oct. 7, 1994 for COMPACT APPARATUS FOR EVERTING A LINER AND METHOD, now U.S. Pat. No. 5,597,353.

BACKGROUND OF THE INVENTION

This invention relates to an improved apparatus for everting a tube or liner used in the lining of existing conduits and a method of everting the liner using the apparatus, and more particularly to an improved apparatus of smaller size than previously available which allows placing the apparatus in the same plane as the conduit to be lined which is not in the same plane as the stored liner, such as the bottom of a manhole when relining a sewer line or other underground pipeline.

A well-known process for rehabilitation of existing conduits, pipelines and passageways generally utilizing a flexible liner to be cured in place is the "Insituform®" method. This method is described in U.S. Pat. No. 4,009,063 for METHOD OF LINING A PIPE and U.S. Pat. No. 4,064,211 for LINING OF PASSAGEWAYS, both to Eric Wood, the contents of which are incorporated herein by reference. In the later issued patent, a tube impregnated with resin is everted into the conduit utilizing a head of water. The head of water required to evert an 8-inch liner is approximately 23 feet. This requires a scaffolding structure of this height to support the tube and water. This procedure and an alternative apparatus is described in prior U.S. Pat. No. 5,154,936 for Apparatus for Everting of Tube which issued on Oct. 13, 1992 and U.S. Pat. No. 5,167,901, for Method for Everting a Tube which issued on Dec. 1, 1992, in which I was a co-inventor and which are assigned to Insituform Licenses BV. The contents of these prior patents are incorporated herein by reference.

Japanese application 01 204 726 shows an apparatus and corresponding method for everting a liner which can be placed in the invert of a manhole and aligned with an existing sewer line. Here, a sealing lip is used to contain the fluid for everting the liner in place of a sphincter valve. A single chamber for receiving everting fluid to force the everting hose out of the pressure vessel.

The apparatuses and methods for everting a tube or a liner for relining a conduit, such as a sewer pipe, gas line or water pipe described in U.S. Pat. Nos. 5,154,936 and 5,167,901 have been satisfactory. These available devices are capable of everting a tube impregnated with resin up to 18 inches in diameter. However, the design is heavy and this makes it difficult to handle in the field. Typically, such apparatuses are about six feet in height and about three feet in diameter. Since there is significant application and installations of diameters of 12 inches and smaller, it is evident that downsizing of such an apparatus and modifying the method to make it more efficient is highly desirable.

Accordingly, it is desirable to provide a compact apparatus and method for everting a tube or liner, especially an apparatus and a method of everting a tube which is more compact and efficient than presently available.

SUMMARY OF THE INVENTION

Generally speaking, in accordance with the invention, a compact apparatus for everting a liner and a method for everting the liner are provided. The apparatus is sufficiently compact and efficient to allow placing the apparatus at the bottom of a sewer manhole with the outlet aligned with a sewer pipe to be lined and rehabilitated. The everting apparatus includes a sphincter-type valve formed by a cylindrical member at the valve outlet of a given diameter a tubular bladder secured to the cylindrical member with the bladder selectively deformed by fluid pressure to engage the flattened liner, yet allow it to pass through to the valve outlet. An is secured to an eversion boot at the outlet of the apparatus where the liner is everted.

The liner is mounted on the outlet end of the tubular eversion boot which has an inlet for pressurized fluid to evert the liner. The eversion boot has a diameter larger than the cylindrical member and overlaps the tubular sphincter-type valve which allows for shortening the portion of the device aligned with the conduit. A down tube which can extend to the top of a manhole, or any convenient height, is mounted on the inlet side of the valve for directing the flattened liner to the sphincter-type valve which is then turned to align with the conduit to be lined and passed through the valve to the eversion boot.

Accordingly, it is an object of the invention to provide an improved apparatus for everting a tube or liner.

Another object of the invention is to provide a compact apparatus for everting a tube or liner which can be placed into a sewer manhole for lining a sewer pipe.

Still another object of the invention is to provide an improved apparatus for everting a tube or liner wherein the energy of the everting fluid is directed to eversion and not overcoming frictional forces of handling and directing the everted tube.

A further object of the invention is to provide an improved apparatus for everting a tube wherein the tube is bent to be aligned with the pipeline or passageway to be relined prior to introduction of the everting fluid against the tube.

Still a further object of the invention is to provide an improved method for everting a tube.

Yet another object of the invention is to provide an improved method for everting a tube for rehabilitating an underground sewer line.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and the arrangement of parts which are adapted to effect such steps and constructions, all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 8 is a schematic drawing similar to FIG. 7 with the liner fully everted and with a lay flat hose in position and hoses rearranged for supply curing fluid.

DESCRIPTION OF THE PREFERRED EMBODIMENTS

Figure 1:
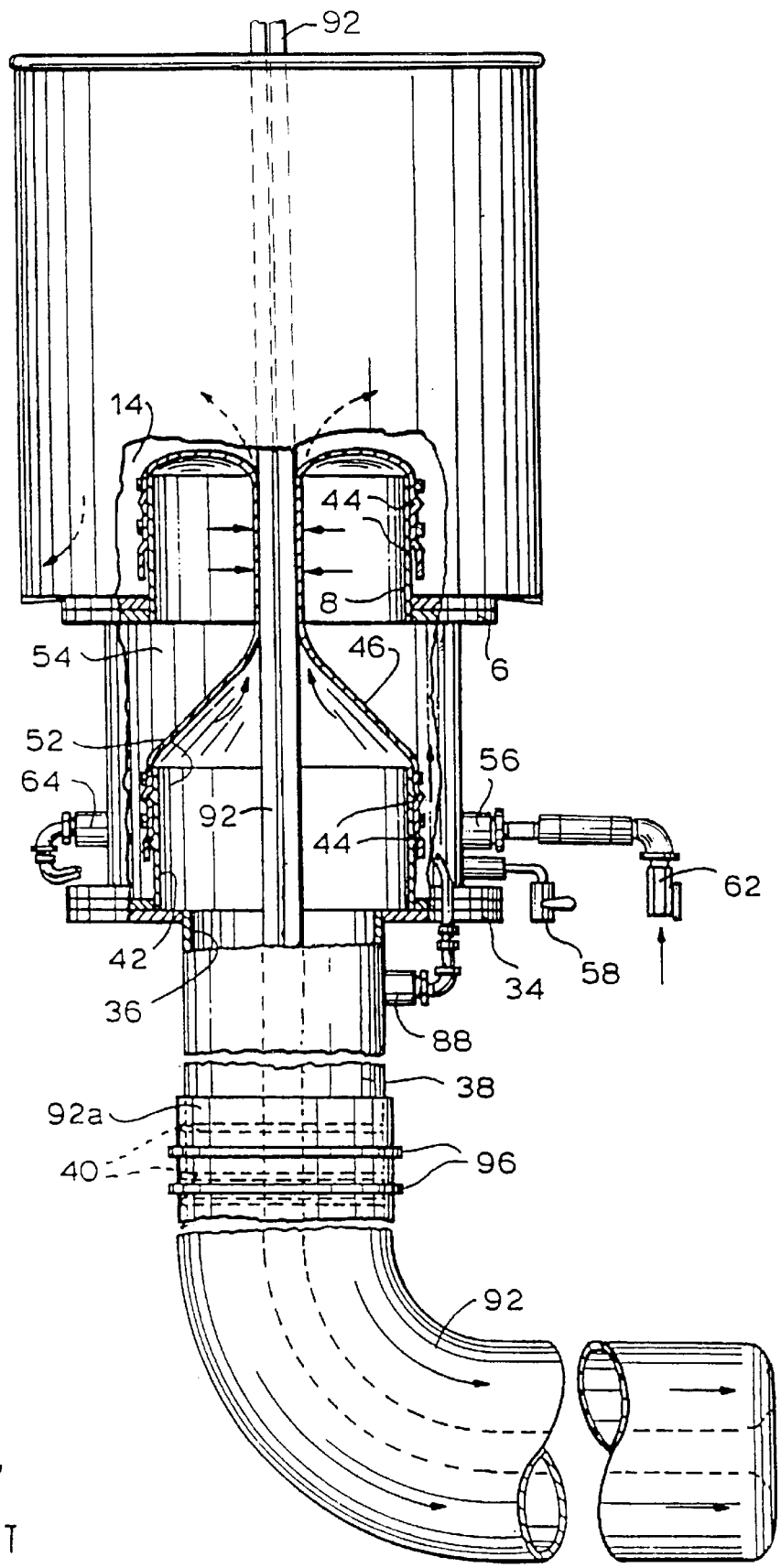
FIG. 1 is an elevational view of an apparatus for everting a tube in accordance with the prior art, showing the operative portions partially broken away with a tube to be everted in place and in the process of being everted.

A tube eversion apparatus 101 on a support frame 2 is described in U.S. Pat. No. 5,154,936 and is illustrated in FIG. 1.

A sphincter-type valve 45 formed by a flexible wall 46 of a suitable flexible rubbery or plastic material in tubular form is sealingly secured to and extends between cylindrical walls 10 and 42 against ribs 44 by straps 48.

Figure 2:
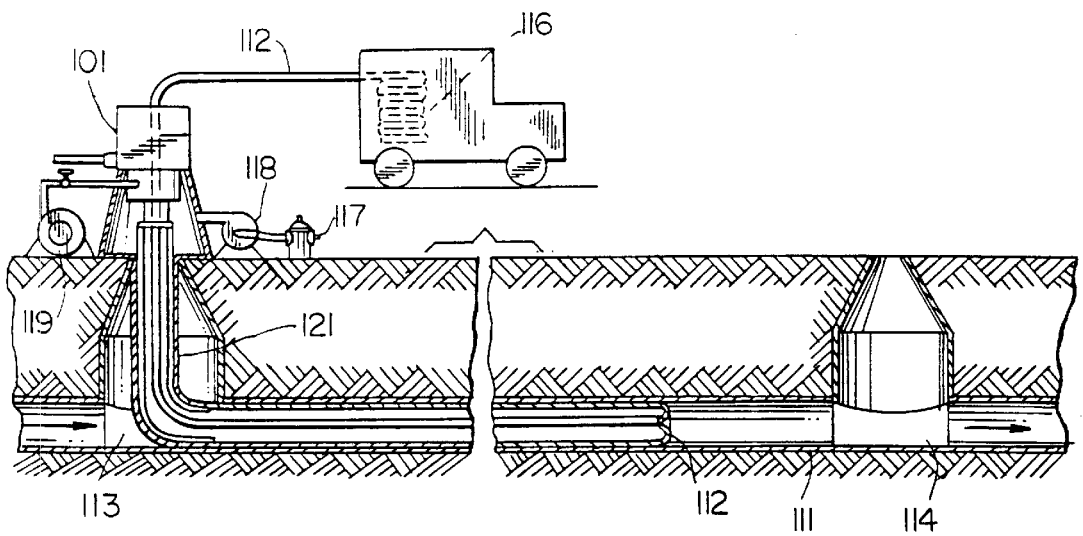
FIG. 2 is a schematic in elevation showing installation of a resin impregnated flexible cured in place liner to rehabilitate an existing sewer conduit utilizing an apparatus of the type illustrated in FIGS. 1–2.

Apparatus 101 is used for the eversion of tube 92 into a remote conduit such as an underground sewer pipe 111 as shown in FIG. 2. Tube 92 may be a resin-impregnated felt liner 112. Which passes through sphincter-type valve 45 through a second chamber 38 defined by cylindrical wall 36 and end 92a of liner 92 is turned over the end thereof and secured by straps 96 between ribs 40.

An everting fluid enters second chamber 38 by an inlet port 80 and forces tube 92 into the existing conduit. Fluid is prevented from escaping through first chamber 14 by pressurizing sphincter valve 45 by pressurized fluid to inlet 56.

As shown in FIG. 2 which is designed to function, after the resin in the felt has been cured, as a lining for sewer pipe 111 or the like into which it has been introduced, substantially as described in the aforementioned Wood U.S. Pat. No. 4,064,211. Once liner 112 has been everted into position in preparation to line sewer pipe 111, heated fluid is provided inside liner 112, heated fluid serving to retain the liner firmly against the inside of sewer pipe 111 and to provide the heat necessary to cause the resin to set. This fluid is provided through a lay-flat hose 94 having a leading end 94a and a trailing end 94b. Leading end 94a is secured to the trailing end of flattened liner 112.

The trailing portion of liner 112 slides through sphincter-type valve 45 defined by wall 46. The pressure of wall 46 on tube 92 sliding therethrough exerts a braking force on the everting tube.

Multiple inflation liners may also be used as described in European Application 90905593, assigned to the assignee herein and incorporated herein by reference.

Figure 3:
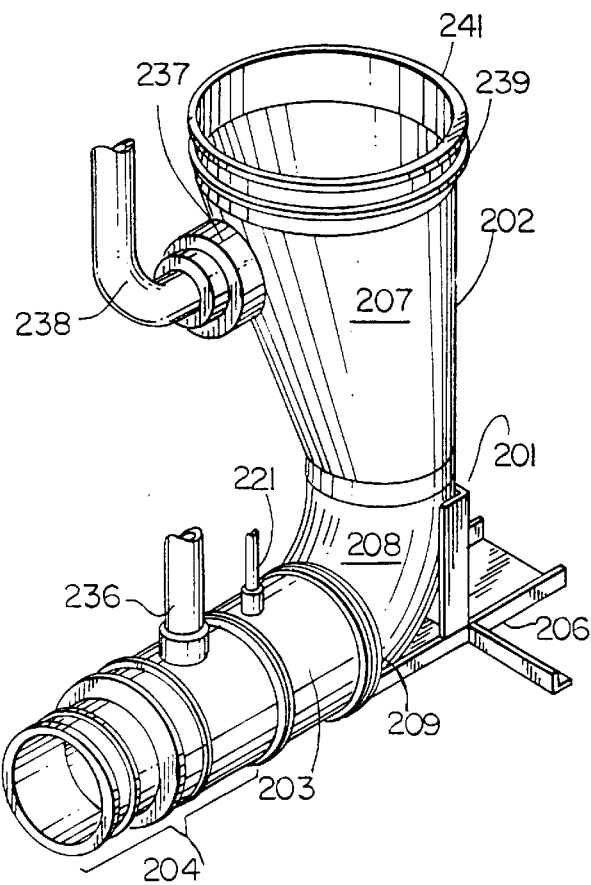
FIG. 3 is a perspective view of a compact apparatus for everting a liner constructed and arranged in accordance with the invention.

A compact apparatus for everting a liner constructed and arranged in accordance with the invention is shown generally at the 201 in FIG. 3. Everting apparatus 201 is assembled from three principal tubular elements as follows and includes a sphincter-type valve 203 similar in construction and operation to valve 45 of apparatus 101. At the inlet side of valve 203 is an inlet tank 202. The outlet end of sphincter-type valve 203 is coupled to an eversion boot 204. Eversion boot 204 at the bottom outlet of apparatus 201 will readily accommodate 6, 8 and 9 inch diameter liners when the lower banding regions are between 5 and 7 inches in diameter. For 10 and 12 inch diameter liners, a larger diameter valve with banding regions between 8.5 and 10 inches in diameter will be required. In alternative embodiments, eversion boot 204 may be removed and replaced with an eversion boot of a different diameter in order to accommodate a change in the diameter of the liner or tube to be everted.

Apparatus 201 may be supported upright on a flat surface by a simple metal rail frame 206 as shown in FIG. 3. Frame 206 is not necessary when apparatus 201 is placed into the invert in a sewer manhole with a downtube as it will be properly oriented vertically. Placement in a sewer manhole is facilitated by the overall dimensions of apparatus 201 which are about two feet wide and about two feet high.

Figure 4:
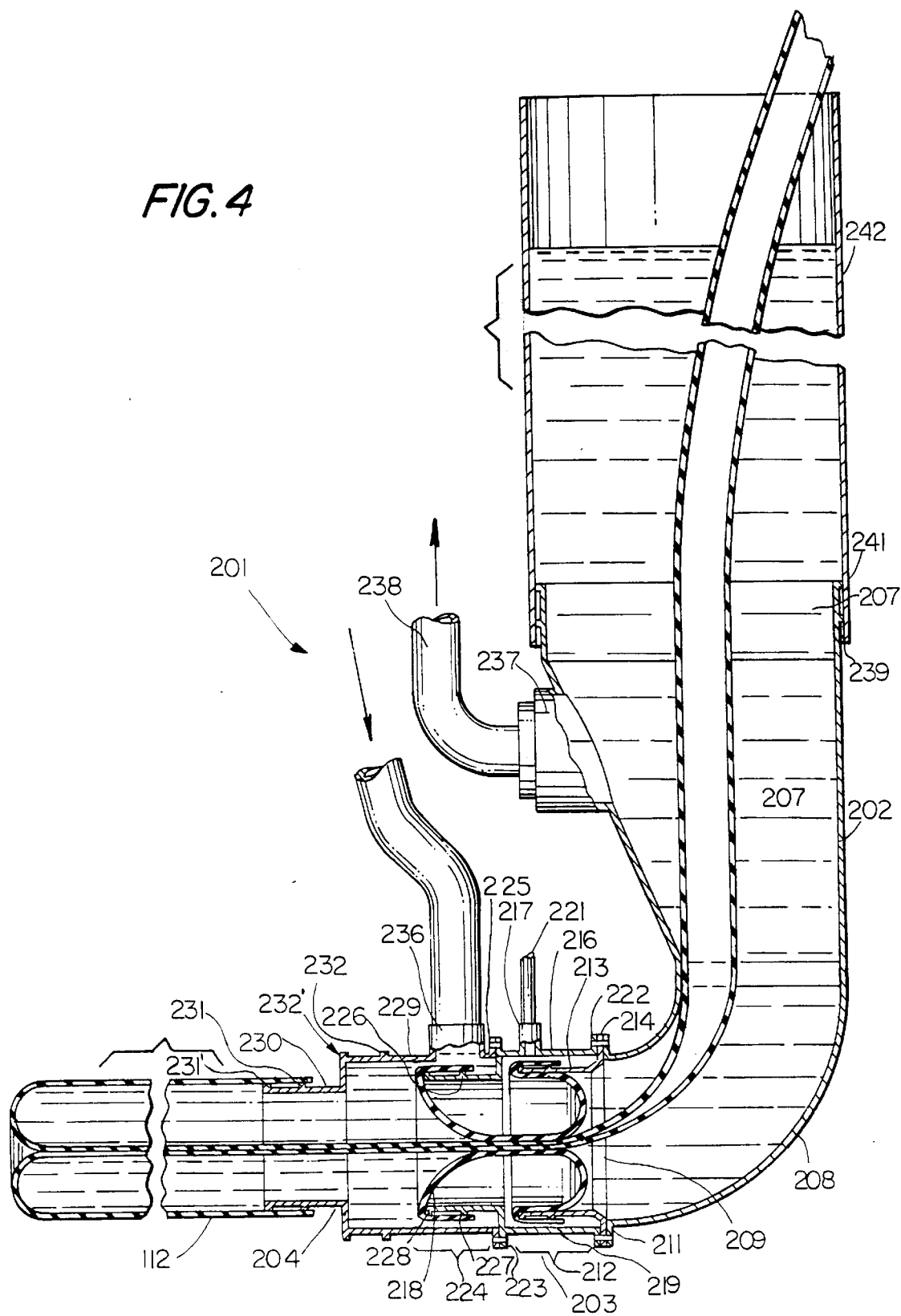
FIG. 4 is a side elevational view of the apparatus for everting a liner of FIG. 3 partially broken away to show a liner to be everted in place.
Figure 5:
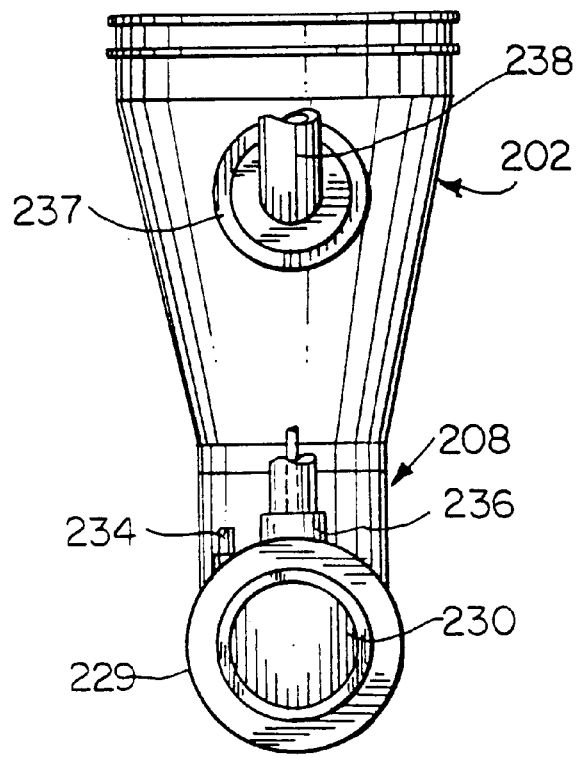
FIG. 5 is a front elevational view of the apparatus for everting a liner of FIG. 3.
Figure 6:
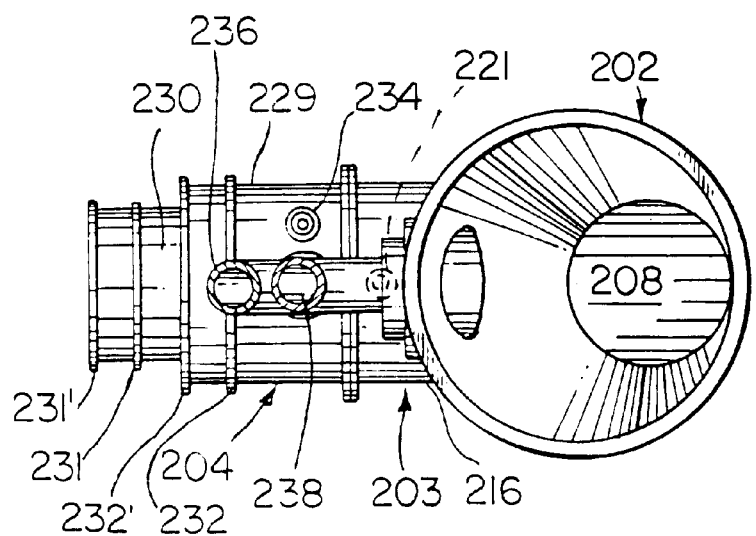
FIG. 6 is a top plan view of the apparatus for everting a liner of FIG. 3.
Figure 7:
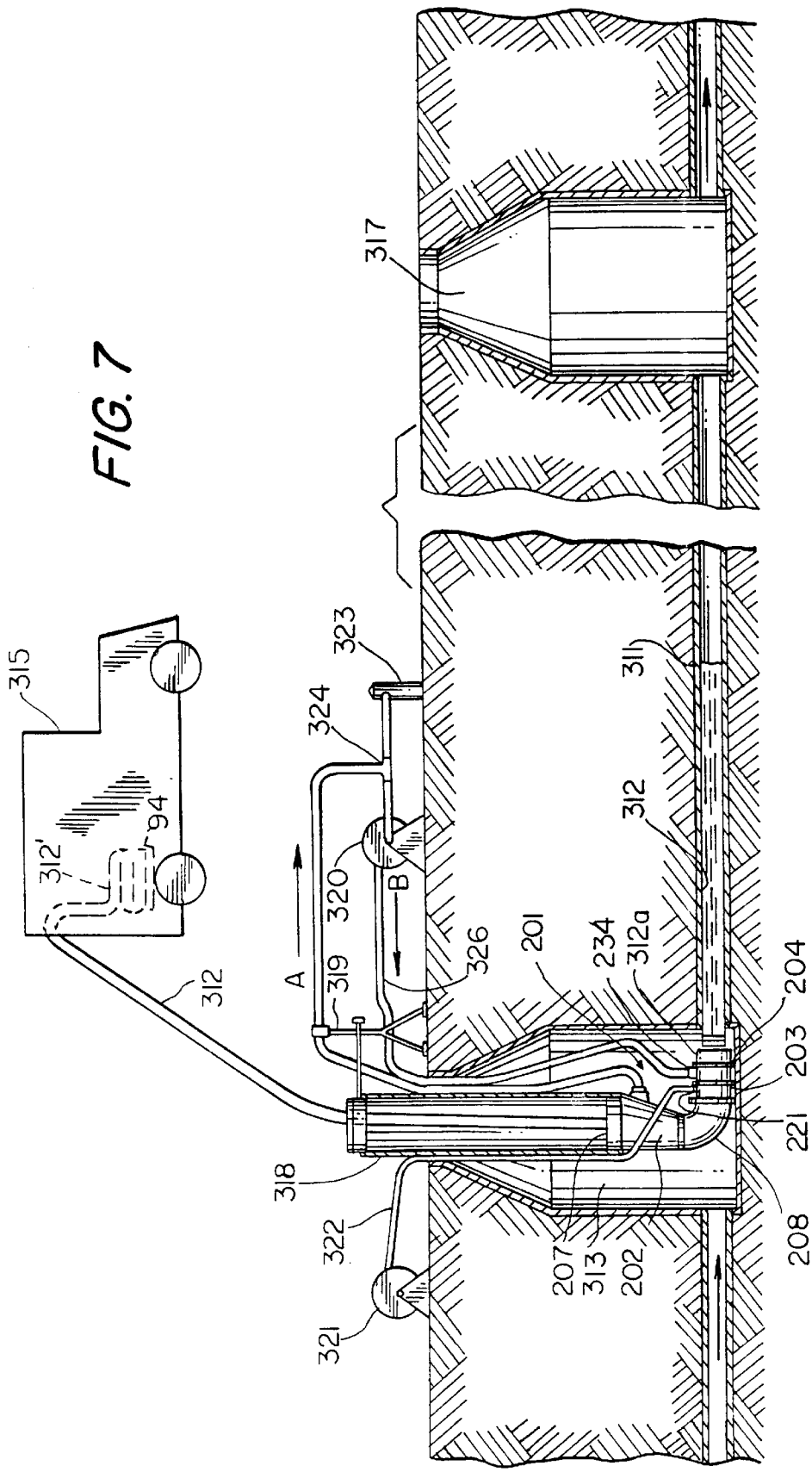
FIG. 7 is a schematic in elevation showing installation of a flexible cured in place liner to rehabilitate an existing sewer conduit utilizing the apparatus of FIG. 3 in accordance with the invention partially broken away to show the liner being everted.

Inlet tank 202 is formed with a conical inlet portion 207 which is substantially vertical and has an open upper inlet end 207' as shown in FIG. 4. Inlet tank 202 extends to a bent elbow portion 208 having an outlet at 209 which is oriented in a substantially horizontal direction. Outlet 209 includes an outlet flange 211 which is fixedly secured to outlet 209 of elbow portion 208.

Sphincter-type valve 203 is formed from a substantially cylindrical upper valve boot 212 which includes an upper valve cylindrical wall 213 fixed to an upper valve flange 214 which is secured to elbow flange 211. The outlet end of valve wall 213 has external ribs 216 and 217 for securing a flexible tubular bladder 218 thereto with straps in the usual manner.

The outer portion of valve 203 is formed from a substantially cylindrical outer wall 219 formed with a fluid inlet coupling 221 for receiving a pressurized fluid inlet, such as an air pressure hose. Secured to the outlet side of external valve wall 219 on the inlet side is an upper flange 222 secured to upper valve boot flange 214 and outlet flange 211 of elbow 208. A lower outlet valve flange 223 is fixed to the outlet end of wall 219.

A lower valve boot 224 is formed from a cylindrical wall 226 extending from the outlet side of lower valve flange 223. Lower valve boot inner wall 226 is formed with external ribs 227 and 228. Valve 203 is completed by fixing flexible tubular member 218 about upper valve boot wall 213 and lower valve wall 224 in a conventional manner as in the case of valve 65 with straps between ribs 216 and 217.

Eversion boot 204 forms the outlet of apparatus 201 and is formed from a substantially cylindrical eversion boot wall 229 having an inlet flange 225 which secures eversion boot 204 to outlet flange 223 of outer valve wall 219. Eversion boot wall 229 is formed with an eversion fluid inlet coupling 236, for coupling to a source of pressurized fluid, such as water, when the everting fluid is water. Pressurized air can be forced into the everting liner through inlet coupling 234 to evert with air and water, or to increase the everting pressure when everting with water.

A secondary coupling 234 is also formed in wall 229 for coupling a pressure gauge thereto for reading the eversion pressure. Two external ribs 232 and 232' are formed at the outlet end of wall 229 for securing the leading end of liner 112 thereto at the start of the eversion process. A secondary installation boot wall 230 may be welded to the outlet of wall 229 for providing a second and smaller boot for securing the everting liner. Secondary wall 230 is also formed with ribs 232 and 232' to facilitate banding the liner thereto.

Inlet tank 202 is formed with a fluid outlet coupling 237 for securing a fluid outlet line 238 for returning water in inlet tube 202 to the circulating pump. An outlet line 238 attached to coupling 237 can be valved so as to control the amount of fluid in inlet tank 202. Level indicators can also be formed on inlet tank 202. The outer wall of open inlet portion 207 of inlet tank 202 is formed with external ribs 239 and 241 to facilitate mounting of a downtube 242, if desired as shown in the schematic illustration during eversion and installation in FIGS. 8 and 9.

Apparatus 201 constructed and arranged in accordance with the invention is particularly well suited, because of its compact configuration, for eversion of a resin impregnated liner 312 into a remote conduit such as underground sewer pipe 311 of FIG. 8. In this process, liner 312 will be fed into and through apparatus 201 which is then lowered into an inlet manhole 313 for lining an existing sewer pipe 311 with liner 312 to a downstream manhole 314. A downtube 318 supported by a stand 319 is affixed to inlet 207 of inlet tank 202 in order to support apparatus 201 and to facilitate feeding of impregnated liner 312 through apparatus 201. In the following description reference to apparatus 201 and its elements utilizes the reference numerals and elements of apparatus 201 as shown in detail in FIGS. 3–6.

In the method for installing liner 312 into conduit 311, liner 312 is generally provided in a flatted and layered condition 312', as is liner 112 at 116 in FIG. 2. Liner 312 is stored in a service vehicle 315 and is continuously fed into downtube 318 through inlet opening 207, through sphincter valve 203 and exits at eversion boot 204 in the same manner as in apparatus 201. At this point the leading end 312a of liner 312 is fixed to the end of eversion boot 204. Fluid pressure such as air, from an air compressor 321, is applied to sphincter valve 203 through an air inlet line 322 at coupling 221. A flattened lay flat hose 94 is affixed to the end of flattened liner 312. When air pressure is applied to sphincter valve 203, this effectively seals off the interior of eversion boot 204 from inlet chamber 202.

Fluid under pressure, preferably water from a hydrant 323, is fed by an external pump 320 to eversion boot 204 through a valved coupling 324 to a water line 326 to primary inlet coupling 234. Since sphincter valve 203 is compressed about liner 312 the pressurized fluid forces everting tube 312 out the outlet of eversion boot 204 into sewer line 311. During this everting aspect of the installation, water flows from pump 320 to eversion boot 204 into everting liner 312. Water escaping into inlet tank 202 through valve 203 is returned via outlet coupling 238 to pump 320. The water flows in a generally clockwise direction as shown by arrows A and B.

Eversion then continues with hose 94 sliding through sphincter valve 203 until eversion is complete as shown in FIG. 8. Leading end 94a of lay flat hose 94 is connected to the trailing end 312b of liner 312 and lay flat hose 94 is connected to the source of curing fluid. During the latter portion of eversion, after trailing end 312b of liner 312 has moved through valve 203 and into eversion boot 204, the fluid pressure within boot 204 causes sphincter valve flexible wall 218 to engage lay flat hose 94 closely, thus effectively closing the upper end of eversion boot 204, but permitting lay flat hose 94 to slide therethrough. Sphincter valve pressure may be adjusted by a pressure adjusting means to accommodate for physical differences between liner 312 and hose 94. When eversion is complete, lining tube 312 is within sewer pipe 311 and is pressed against the interior of that pipe by the pressure of the everting water.

After the eversion is complete, external eversion pump 320 provides heated fluid such as water to lay flat hose 94 from a boiler 316 provided in a second service vehicle 327. That heated water escapes from leading end 94a of lay flat hose 94 and circulates back through the length of liner 312 into inlet chamber 202 and then out outlet line 326 to coupling 324 and is returned to the inlet of boiler 316 by a water line 328. At this time the flow of heated water from boiler 316 is generally counter-clockwise as shown by arrows C, D and E.

The pressure exerted on sphincter valve 203 may be adjusted to facilitate the flow of the heated fluid through the sphincter valve and/or adjust the pressure on the liner, if such adjustment is necessary. This procedure continues for the period of time needed to cause the resin within liner 312 to set. The pressure in eversion boot 204 may be adjusted to provide for optimum functioning during this period, that being accomplished through adjustment of valve controls fixed to eversion fluid inlet 234 of eversion boot 204 and to sphincter valve 203 at inlet 221.

In a typical embodiment apparatus 201 is approximately two feet in height. The width along elbow 208 to eversion boot 204 is also approximately two feet. This will facilitate ready placement of apparatus 201 within a typical sewer manhole. The use of an eversion boot having a diameter larger than the flexible wall so as to overlap allows for the compact size of apparatus 201. Less everting pressure is required than in prior devices because the liner is first turned and aligned to the conduit to be lined prior to everting. Thus, the pressurized everting fluid is utilized solely to evert the liner and is not required to force an everted liner around various bends into alignment with the conduit to be lined.

It will be seen that the objects set forth above, among those made apparent from the preceding description, are efficiently attained and, since certain changes may be made in carrying out the method and in the apparatus set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features herein described and all statements of the scope of the invention which, as a matter of language, might be said to fall therebetween.

What is claimed is:

1. A method for everting a liner for inserting into an existing conduit to be lined, comprising:

providing a substantially tubular liner which is collapsed along its longitudinal axis;

feeding the collapsed liner along a first directional axis into an eversion apparatus;

changing the feeding direction of the collapsed liner within the eversion apparatus to a second directional axis which is different from the first directional axis with the liner remaining in the collapsed condition;

feeding the collapsed liner along the second directional axis through sphincter valve means having an inlet and an outlet;

affixing the leading end of the liner to the outlet of the sphincter valve means to evert the end of the liner;

positioning the outlet of the sphincter valve means with the end of the liner affixed thereto to be aligned with the outlet to the conduit to be lined; and applying pressurized fluid to the interior of the collapsed and everting liner now aligned with the conduit to be lined to force the liner to be everted out of the sphincter valve means along the second directional axis and into the conduit to be lined.

2. The method for everting a liner of claim 1, including controlling the pressure applied to the sphincter valve means with air to control the operation thereof.

3. The method for everting a tube of claim 1, including applying pressurized water as the fluid applied to the interior of the everting liner to cause the liner to evert.

4. The method for everting a liner of claim 1, including recirculating fluid from the eversion apparatus.

5. The method for everting a liner of claim 1, including feeding pressurized air to the sphincter valve means for controlling the valve and feeding water to the outlet of the sphincter valve means for causing the tube to evert from the outlet of the sphincter valve means.

6. A method for everting a liner for inserting into an existing conduit to be lined, comprising:

feeding the collapsed liner along a first directional axis;

continuing to feed the collapsed liner along another directional axis different than the first directional axis, said second axis aligned with the existing conduit;

affixing the leading end of the liner to the outlet of a sphincter valve means which is aligned with the axis of the existing conduit to evert the end of the liner; and applying pressurized fluid to the interior of the collapsed and everting liner aligned with the outlet of the existing conduit to force the liner to be everted out of the sphincter valve means and into the conduit to be lined.

7. A method for everting a liner for inserting into an existing conduit to be lined, comprising:

providing an eversion apparatus comprising an elongated sphincter valve means and an eversion boot coupled to the outlet of the sphincter valve means with the tubular wall of the eversion boot overlapping a portion of the sphincter valve means, and having a longitudinal axis which is substantially aligned with the longitudinal axis of the conduit to be lined;

providing a substantially tubular liner which is collapsed along its longitudinal axis;

feeding the leading end of the collapsed liner through the sphincter valve means of the eversion apparatus and affixing the leading end of the liner to the outlet of the eversion boot; and applying pressurized fluid to the interior of the collapsed and everting liner to force the liner to be everted out of the sphincter valve means and eversion boot along the longitudinal axis of the sphincter valve means and into the conduit to be lined.

8. The method for everting a liner of claim 7, including controlling the pressure applied to the sphincter valve means with air to control the operation thereof.

9. The method for everting a tube of claim 7, including applying pressurized water as the fluid applied to the interior of the everting liner to cause the liner to evert.

10. The method for everting a liner of claim 7, including recirculating fluid from the eversion apparatus.

11. The method for everting a liner of claim 7, including feeding pressurized air to the sphincter valve means for controlling the valve and feeding water to the outlet of the sphincter valve means for causing the tube to evert from the outlet of the sphincter valve means.

12. The method for everting a liner of claim 7, including the steps of feeding the collapsed liner along a second directional axis different from the longitudinal axis of the existing conduit and bending the collapsed liner within the eversion unit having a bent portion for aligning the collapsed liner with the longitudinal axis of the sphincter valve means and existing conduit.

* * * * *